Figure 1:
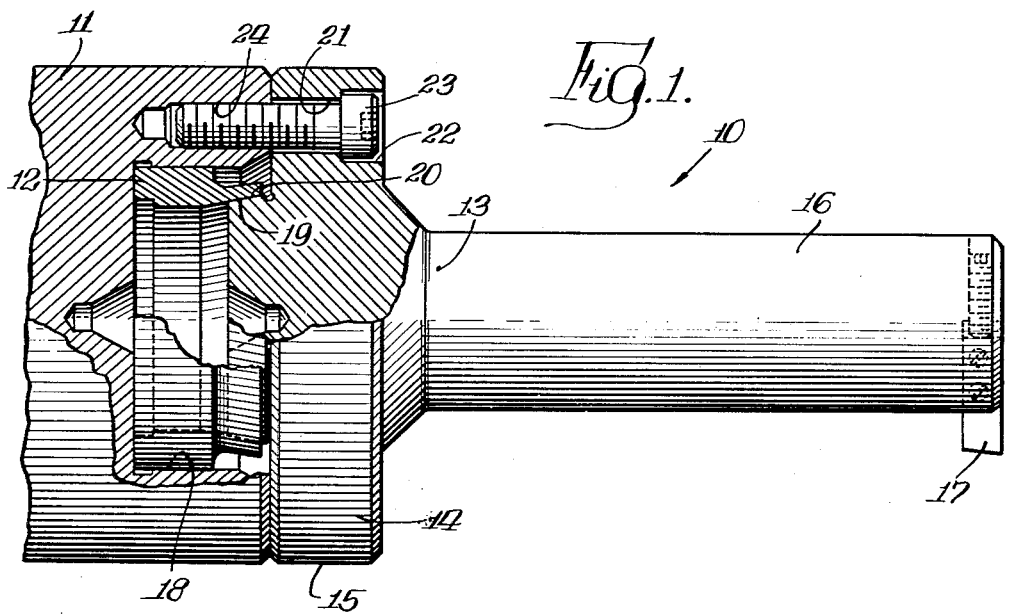

July 3, 1962 — B. R. BETTER — 3,041,898
TOOL CENTERING DEVICE
Filed Jan. 9, 1958

INVENTOR.
Bernard R. Better,
BY
Brown, Jackson, Boettcher & Dienner
Atty's.

United States Patent Office 3,041,898
Patented July 3, 1962

3,041,898
TOOL CENTERING DEVICE
Bernard R. Better, Chicago, Ill., assignor to Scully-Jones and Company, Chicago, Ill., a corporation of Illinois
Filed Jan. 9, 1958, Ser. No. 707,940
1 Claim. (Cl. 77—58)

This invention relates to machine tools and, more particularly, to a means for centering tools in machine tool spindles, such as in horizontal boring machines.

A general object of this invention is the provision of a new and improved tool centering means which will permit the centering of a cutting tool in a boring machine spindle more accurately, more quickly than heretofore, and with a greater degree of rigidity.

In conventional boring machine spindles, it has been the practice to provide a tool holding arbor with a shank, either long or short, and with a steep or slight taper which fits into a complementary hollow bore or socket of a machine spindle and cooperates with a draw bar or with screws in the spindle to be secured therein. Such arbors, characterized as the sticking type or the non-sticking type, depending upon the taper of the spindle and shank, may be further provided with a radially extending flange which is either drawn tightly against the end or face of the spindle or to a position slightly spaced from the face of the spindle by any suitable means, such as screws.

Each of these tool holding means has defects which make it difficult to precisely center the tool for the cutting operation. Those types of arbors with a radially extending flange and a relatively steep tapered surface introduce bending stresses due to manufacturing inaccuracies when a tightening means brings the flange against the end of the spindle and, by this arrangement, the cutting tool itself, becomes more in error due to its considerable distance from the spindle end which magnifies any error introduced. Those types of arbors having a long slight tapered surface, with or without the radially extending flange, introduce error by reason of the fact that grit, dirt and the like find their way between the slight tapered surface and its complementary surface in the spindle. Too, such long slight tapered tool holders are quite difficult to remove due to their natural sticking characteristics. Also, the type of radially extending flange which is not drawn tightly against the spindle end does not add to the rigidity of the connection, nor has the provision of a cylindrical shank to fit a cylindrical bored spindle, (as contrasted to the tapered shank and tapered socket) sufficiently overcome the difficulties of centering tools and the like.

Accordingly, still another general object of this invention is to improve tool centering means over prior art devices.

I contemplate accomplishing the general objects of this invention by providing a member with a relatively short, thin walled, resilient, conical or tapered nonsticking type surface received in a bore or socket in the spindle of a machine tool, or by providing such a thin walled resilient tapered non-sticking type surface on a tool holding means or arbor, and having this thin walled resilient tapered non-sticking surface cooperate with a mating, solid or heavy walled tapered surface on the spindle or arbor as the case may be. Rigidity of the coupling of the spindle and arbor is obtained by means of a radially extending flange on the tool holding means brought snugly against the end of the spindle.

More specifically, in one embodiment of my invention, the spindle is provided with a centrally located bore in which is received a replaceable ring member having a resilient, thin walled, short, conical, non-sticking type tapered inner surface which cooperates with a correspondingly tapered, conical, solid, mating surface located radially inwardly of the outer periphery of the flange of the tool holding means. Suitable means are provided radially outwardly of the tapered surfaces for coupling the arbor to the spindle.

In the other embodiment, the tool holding means is provided with a similar thin walled, resilient, short, conical, non-sticking type tapered surface on its flange and is adapted to encompass the peripheral, mating, solid, conical surface on the spindle. Suitable means are provided radially inwardly of the conical surfaces for suitably coupling one to the other.

Accordingly, another object of my invention is the provision of a new and improved tool centering means so constructed and arranged as to provide a lesser margin of error than that found in conventional arrangements of this type, and which has the rigidity necessary for accurate cutting.

Still another object of my invention is a new and improved tool centering means for machine tools which is provided with a non-sticking type conical surface so constructed and arranged as to provide rigidity and accurate centering.

Figure 2:
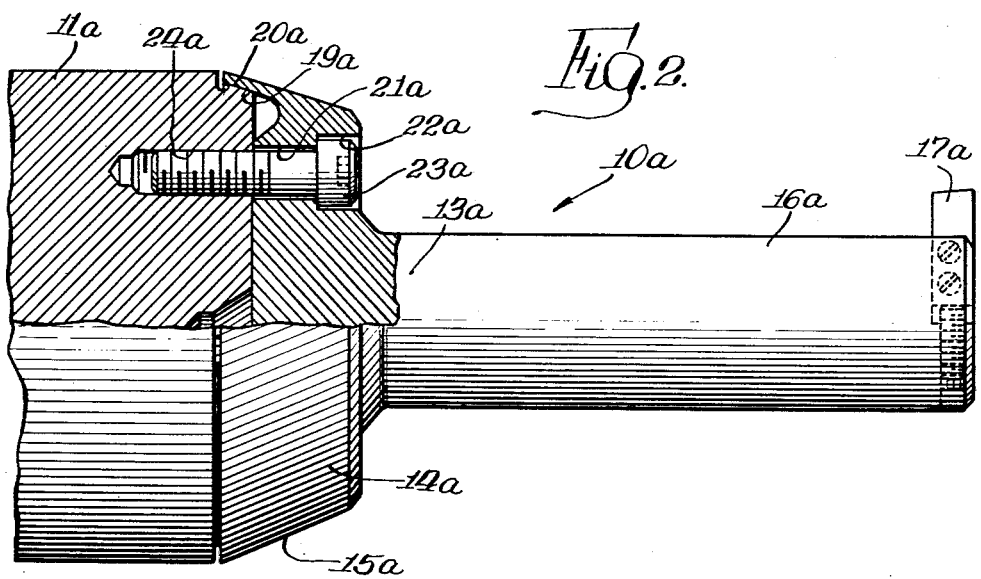

Other and more particular objects of my invention will be apparent to those skilled in the art from the following description and drawings forming a part hereof and wherein:

FIG. 1 is a side elevational view, partially broken away and in section showing to advantage one embodiment of my improved tool centering means; and FIG. 2 is a side elevational view, partially broken away and in section, of another embodiment of my improved tool centering means.

As shown in FIG. 1 of the drawings, my new and improved tool centering means, indicated in its entirety as 10, is adapted to cooperate with the rotatable machine spindle 11 of an automatic machine, such as a horizontal boring machine. The tool centering means 10 comprises a relatively thin annular ring 12 and a tool holding means 13 having an enlarged flange 14 with an annular outer surface 15 and of a diameter equal to the diameter of the spindle 11 and greater than the diameter of the annular ring 12. In this embodiment, the tool holding means 13 comprises a boring bar 16 formed integral with the flange 14 to hold a cutting tool 17.

Ring 12 is press fitted into a cylindrical bore 18 and is provided on its radially inner side with a relatively thin walled, resilient outwardly, non-sticking type, tapered surface 19. In this embodiment, such surface is made resilient by cutting away a portion of the ring radially outwardly of the tapered surface. The flange 14 on the side opposite the boring bar 16 is provided with a narrow, solid or heavy walled, tapered surface 20, tapering inwardly, to cooperate with the outwardly tapered resilient surface 19 of the ring. The resiliency of the tapered surface 19 aids in centering the boring bar as will be apparent from the further description hereinafter.

The flange 14 is bored radially outwardly of the tapered surfaces as at 21 and counter-bored as at 22 to receive screws 23 which are threadably received in a threaded bore 24 in the end of the spindle 11. By this arrangement, the flange 14 is drawn tightly against the end of the spindle. The clearance provided by making the bore 21 oversized with respect to the shank of the screw, permits, together with the resiliency of the tapered surface 19, the centering and truing of the boring bar 16.

While I have shown the boring bar 16 as an integral part of the flange 14, obviously, the bar need not be integral with the flange and could be replaced with an adapter, a chuck or any other holding means for cutting tools of any type.

Turning now to FIG. 2 where I have disclosed another embodiment of my tool holding means, indicated in its entirety as 10a, there is disclosed a spindle 11a which cooperates to center the tool holding means 13a. It is to be noted that in this embodiment, the ring 12 is omitted but the annular surface 15a of the flange 14a is provided with a resilient, thin walled, non-sticking type, tapered surface 19a which performs the same function as the tapered surface 19 of the ring 12. Furthermore, instead of providing the flange 14 with a tapered surface such as 20 in FIG. 1, the spindle 11a itself is tapered to provide a short, heavy walled, tapered surface as illustrated at 20a. The tapered surface 19a is made resilient by cutting away a portion of the flange 14a and further extends outwardly beyond the flange 14a to encompass the tapered surface 20a as illustrated. In like manner, the flange 14a is bored and counter-bored as indicated at 21a and 22a to threadably receive the screw means 23a in a threaded bore 24a of the spindle 11a. It is to be noted however, that in this embodiment, the screw is located radially inwardly of the tapered surfaces, but such screws will cooperate to center the tool 17a in the same manner as the screws shown in the other embodiments.

While I have shown the boring bar 16a in this embodiment as an integral part of the flange 14a for centering the tool 17a, in like manner, this boring bar could be made a separate part of the flange and could be adapted to receive other attachments for holding other tools and the like; boring bar 16a being illustrated herein merely for purposes of explanation.

While in both embodiments, I have illustrated only one screw type attaching means, the use of more than one is contemplated, one being shown only for convenience of illustration.

Thus, it can be seen in both embodiments, I have utilized a relatively short, resilient, non-sticking type taper and means bringing a tool holding means tightly against the end of a machine spindle to center cutting tools. With this arrangement, there is less margin of error than found in conventional arrangements of this type, yet the arrangement possesses the rigidity necessary for accurate tooling. This arrangement also overcomes the errors which have been heretofore introduced by grit and the like by long tapers and has overcome the defects of bending stresses in relatively steep tapered surfaces.

Where herein I have described the tapered surfaces of my invention as of the "non-sticking" type, it is to be understood that this terminology is used to describe and is intended to include the function of the two surfaces whether "slight" as in the case where a "sticking" type taper as known in the art may be used, but with a proper lubricant to make it "non-sticking," or where a "steep" taper is used, known in the art as the "non-sticking" type; the important point being that the tapered surfaces of my invention should not stick to each other so as to need an additional means of separating them after a suitable tightening means, such as the screws 23 or 23a, have been removed. Also where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claim which should be construed as broadly as the prior art will permit.

I claim:

Means for mounting a tool holder in rigid and centered relation on a spindle or like member of a machine tool or the like, comprising a tool holder having a tapered rigid surface and a second rigid surface, a tapered, thin-walled, resiliently yieldable surface on said spindle member matable with said tapered surface of the tool holder for centering thereof on the spindle member, a rigid second surface on the spindle member engageable by said second tool holder surface, and means for securing the tool holder on the spindle member with said tapered surfaces matingly engaged to dispose the holder coaxially of the spindle member and with said second surfaces in rigid engagement for rigidifying the holder, said tapered, thin-walled, resiliently yieldable surface being provided on a ring-like element having a press fit in a recess of the spindle.

References Cited in the file of this patent

UNITED STATES PATENTS

| | | |
|---|---|---|
| 2,040,225 | Walther | May 12, 1936 |
| 2,368,846 | Klomp | Feb. 6, 1945 |
| 2,558,815 | Briney | July 3, 1951 |
| 2,643,556 | Briney | June 30, 1953 |
| 2,828,672 | McMullen | Apr. 1, 1958 |

FOREIGN PATENTS

| | | |
|---|---|---|
| 434,466 | Italy | Apr. 27, 1948 |